March 24, 1931.  A. F. GILLET  1,797,230

SECURING MEANS FOR ANTISKID CHAINS

Filed Dec. 6, 1929  2 Sheets-Sheet 1

Inventor
A. F. Gillet
By Arthur H. Sturges
Attorney

March 24, 1931. A. F. GILLET 1,797,230
SECURING MEANS FOR ANTISKID CHAINS
Filed Dec. 6, 1929 2 Sheets-Sheet 2

Inventor
A. F. Gillet
By Arthur H. Sturges
Attorney

Patented Mar. 24, 1931

1,797,230

UNITED STATES PATENT OFFICE

ALEXIS F. GILLET, OF OMAHA, NEBRASKA, ASSIGNOR TO JUBILEE MANUFACTURING COMPANY, OF OMAHA, NEBRASKA, A CORPORATION OF NEBRASKA

SECURING MEANS FOR ANTISKID CHAINS

Application filed December 6, 1929. Serial No. 412,172.

The present invention relates to improvements in detent means for anti-skid chains, and has for an object to provide an improved chain holding device, which may be installed on the automobile or other vehicle without requiring the "jacking-up" of the wheels, whereby the device can be installed in deep mud or snow where it is always inconvenient, and sometimes impossible, to jack up the wheel to install the usual type of chain.

Another object of the invention is to provide an improved anti-skid device in which provision is made for holding anti-skid cross chains about pneumatic tires of automobiles and enabling same to be readily put in place, where they are securely held during travel of the vehicle, and to be conveniently removed therefrom.

A further object of the invention is to provide an improved chain holding device involving only slight modification to standard parts, whereby these parts are converted into more efficient means for holding the cross chains, and permitting of the ready attachment and detachment of the same.

A still further object of the invention is to provide improved lugs ordinarily employed for holding the tire and rim upon the felly which lugs, according to the invention, are equipped to receive the cross chain and retain the cross chain securely in place.

A still further object of the invention is to produce a modified form of bolt for holding the improved lugs in place, the bolt and lugs being constructed according to standard practice to fulfill the usual functions expected of them, and to be further rearranged and supplemented to provide additional parts for the carrying of the cross chain.

A still further object of the invention is to provide an improved chain holding device in which the chain is at all times held in a taut condition and against loss.

A still further object of the invention is to provide an improved chain holding device in which the parts are simple, rigid and strong, and in which the parts are so shaped and designed as not to interfere with the brake mechanism or other parts of the vehicle.

The present invention may be used with the type of chain disclosed in my co-pending application, Serial No. 357,101, filed April 22, 1929.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary cross sectional view taken through a wheel, felly and tire and showing the improved anti-skid chain and holding device applied thereto.

Figure 5:
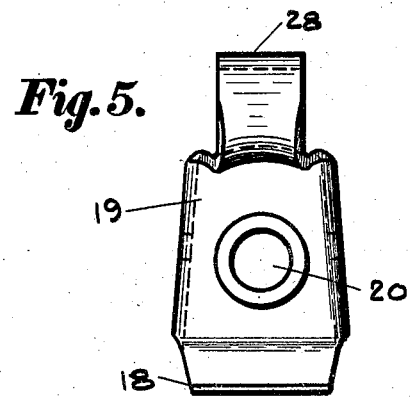
Figure 5 is a plan view of one of the lugs employed at the opposite side of the wheel.
Figure 6:
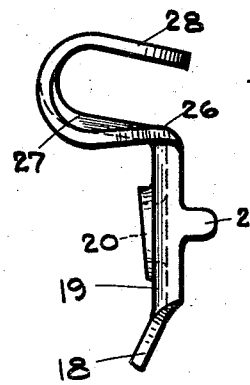
Figure 6 is an edge view of the same.
Figure 7:
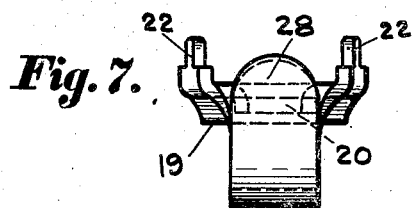
Figure 7 is a top plan view of such lug.

Referring more particularly to the drawings 12 designates a disc or other wheel connected by the bolts or other appropriate fastenings 13 with the felly 14. This felly is adapted to receive the rim 15 carrying the tire 16 by a slidable movement of the tire transversely of the felly, the felly being provided with an abutment or shoulder 17 at one side to receive the tire rim 15 thereagainst. The opposite side of the rim 15 is held on the felly by the flanges 18 of lugs, such as shown in Figures 5, 6 and 7.

Referring to these figures, the flange 18 is shown to extend from one edge of the lug 19 which is made of metal or other appropriate material. Considered from the hub or center of the wheel, the lug 18 extends from the outer edge of the lug 19 and projects radially away from the center of the wheel.

A reinforced opening 20 is made through the central portion of the lug plate 19 for the passage therethrough of a cross bolt 21 which is a customary part passing through the flanges of the felly 14, and extending outwardly therebeyond to carry the two sets of customary lugs found at the inside and the outside of standard automobile wheels. Tongues 22 project at right angles to the plane of the lug plate 19 and are adapted to enter openings 23 made in the outer flange of the felly 14. These tongues 22 are adapted to resist any turning movement of the lug 19 about the bolt 21 as a center. Nuts 24 are provided upon the bolts 21 and take against the lugs 19 for the purpose of binding the parts in place.

Figure 1:
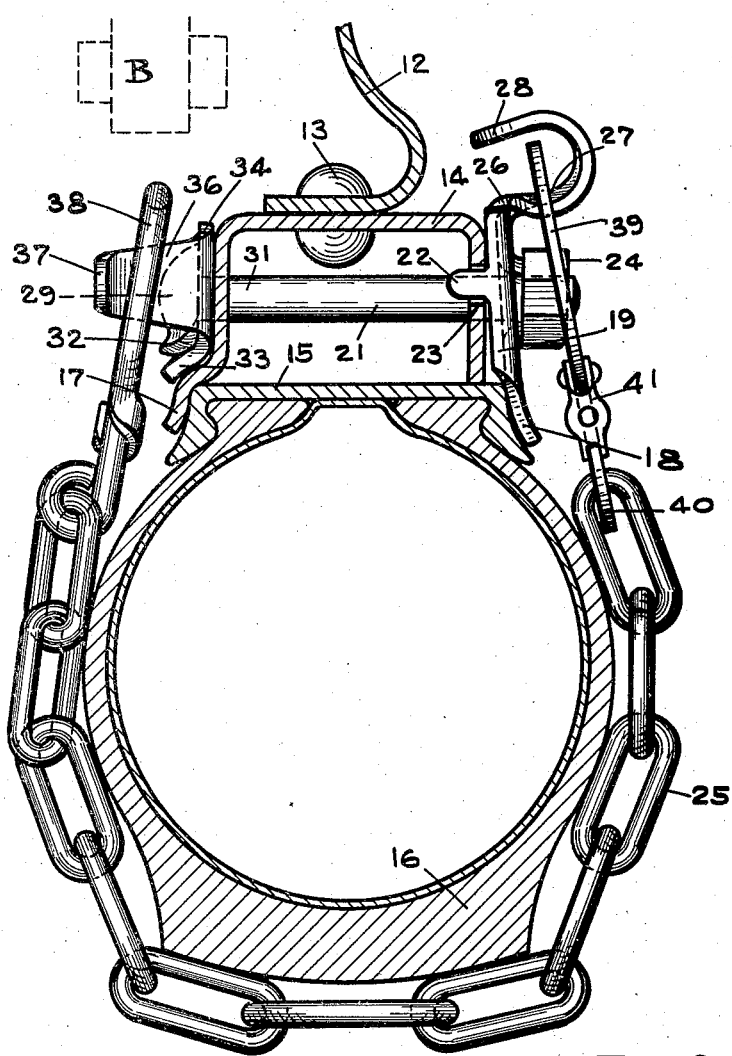

Each lug 19 is provided with a hook for holding the cross chain 25 which extends about the tire 16, shown in Figure 1. The hooks are preferably formed integral with the lug plate 19 and they project radially inward from the inner edge of such lug plate 19, so that they are remote from the rim 15 and from the tire and they are so shaped as to lie wholly within the perimeter of the tire, and they thus fall within the protection of the side walls of the tire which will engage the curbing first and thus avoid any damaging contact of the hooks with extraneous parts.

These hooks are also of a peculiar shape in that the open mouths of the hooks are faced toward the wheel 12 or in other words are faced inwardly and the hooks are entirely closed on all other sides. Humps 26 are made at the initial portions of the hooks adjacent the lugs 19, and such humps form high points to tend to retain the cross chain or its ring in place, the ring adapted to occupy the depression or seat 27 which lies inwardly of the hump 26. The bill 28 of the hook extends in a substantial semi-circle from the depressed seat 27 and forms a bulged part presented outwardly, which if struck, will resist bending or distortion.

Figure 2:
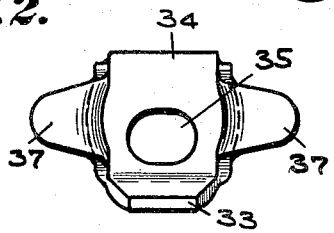
Figure 2 is a plan view of one of the improved lugs employed.
Figure 3:
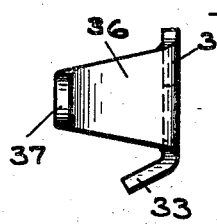
Figure 3 is an edge view of the same.
Figure 10:
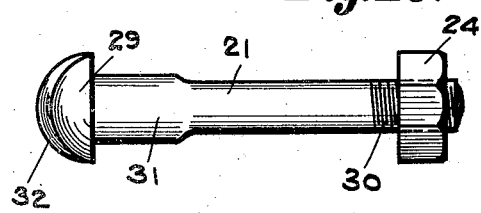
Figure 10 is a side view of the improved bolt employed.

The bolt 21 is more particularly shown in Figure 10, and in so far as it is provided with a head 29 and with threads 30, upon which the nut 24 is run, this bolt is an exact duplicate of the standard bolts employed at the present time upon vehicle wheels. However, it is modified in that it is provided with an enlarged oval portion 31 adjacent the head 29, and with a lip 32 formed upon the head 29 and projecting radially outward therefrom, whereby to rest against a flange 33 upon the improved lug 34, shown in Figures 2, 3 and 4.

Referring more particularly to these figures, the improved lug 34 sustains all of the characteristics of the standard lug, except in the following particulars:—

Figure 4:
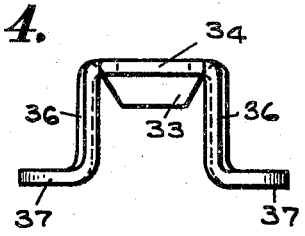
Figure 4 is a top plan view of the improved lug.

An opening 35 is provided in the body portion of the lug 34 of an oval shape to snugly fit about the oval portion 31 of the bolt 21; whereby the bolt 21 and lug 34 will resist relative turning movement. This turning movement will further be resisted by the engagement of the lip 32 of the bolt head 29 with the flange 33 of the lug 34. The lug 34 is further provided with outstanding wings 36 provided with angular tips 37 bent at substantially right angles to the wings 36. The wings 36, as shown in Figure 4, extend out at approximately right angles to the plane of the lug plate 34 and such wings are preferably made integral with the lug plate 34, merging with the side edges thereof. The tips 37 are preferably rounded and tapering. The wings 36 also preferably taper outwardly or become gradually thinner.

Figure 8:
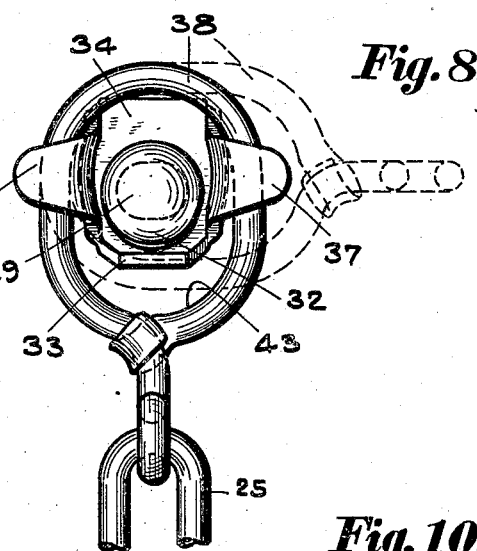
Figure 8 is a plan view of the construction at one side of the felly showing the engagement of the chain ring with the improved lug.

The cross chain 25 has at one end a ring 38, shown in Figures 1 and 8, such ring adapted to engage the lugs 34 at the inner side of the wheel. At the other end each cross chain 25 is provided with a ring or yoke 39 adapted to engage with the hooks of the lugs 19 at the outer side of the wheel.

Figure 9:
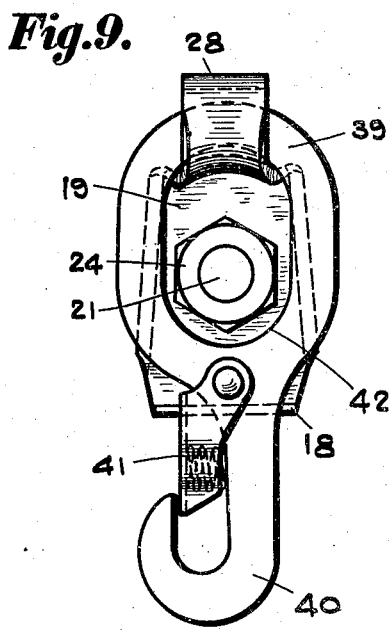
Figure 9 is a similar view of the parts at the opposite side of the wheel.

This ring or yoke 39 is shown in Figures 1 and 9. A snap hook 40 is carried by the ring 39 to engage with the end, or with a selected link of the chain 25. The chain is detachable from the snap hook 40 by shifting inwardly the spring pivoted catch 41 of such hook. The ring or yoke 39, is provided with an interior oval opening 42 to engage about the nut 24 of the bolt 21; whereby to permit the yoke or ring 39 to extend substantially vertically or in line with the connected portion of the cross chain 25, so that strains arising from the cross chain and devolving upon the ring, will not tend to bend the ring, as would be the case if such ring were supported at its intermediate portion by the nut 24 and held out of alinement with the line of strain referred to.

In a similar manner the ring 38, as shown in Figure 8, is provided with an internal oval opening 43, which extends about the entire lug body 34 and which enables the ring 38 to extend in line of strain with the chain end to which it is connected; and which further permits the ring 38 to be turned to the dotted line position, as shown in Figure 8, which is necessary in the assembling and removal of the device.

In the use of the device, when an automobile is purchased, the standard bolt and lugs are discarded in favor of the bolt 21, and the lugs 19 and 34 according to the present invention; it being understood that the latter conform in all essential particulars to the standard variety and that they fulfill all of the functions of the same.

The new parts being installed, and it being desired to put the cross chains 25 upon the wheels, the rings 38 are first shifted to the position shown in Figure 8, and slipped over one horn or tip 37 of the lugs 34, and then are shifted so as to slip over the opposite horn; whereupon such rings 38 are turned to the full line position, shown in Figures 1 and 8, and the connected cross chain 25 is brought across the tire and a selected link thereof joined in the snap hook 40; it being understood that the ring 39 has been previously placed upon the hook 28 of the outer lug 19. In this way any link of the chain 25 may be coupled to the snap hook 40, whereby the chain will be taut. The inner open mouths of the hooks 28 are so positioned as to avoid the picking up of earth, mud or any foreign material which would be apt to clog the hook, and such hook will tend to more effectually retain the ring 39 in place and against accidental displacement, which would result in loss of the cross chain 25.

Once the new bolts and lugs are inserted, they remain upon the vehicle so as to be in readiness to receive the cross chains whenever the occasion demands. These cross chains may be individually attached to the lugs at the upper portion of the wheel, so that there is no need to jack up the vehicle to perform this work. For this reason great convenience is had in the application of the anti-skid chains and in the removal thereof, and this task becomes a much cleaner one. Of course, the rings and the cross chains are removed when their use is not demanded or found convenient.

As shown more particularly in Figure 1, B represents the brake mechanism in dotted lines. It will be apparent that the arrangement, construction and disposition of the parts at the inner side of the wheel is such as not to interfere in any wise with this brake mechanism. The inner edges of the lugs 34 are in alinement with the inner portion of the felly 14 and do not extend inwardly of this felly. Of course, the outer side of the wheel is entirely free, there being ample space for the hooks 28.

I do not wish to be restricted to the size, form, and proportions of the various parts, and obviously changes could be made in the construction hereto described without departing from the spirit of the invention, it being only necessary that such changes fall within the scope of the appended claims.

What is claimed is:—

1. In a securing means for anti-skid chains, a lug comprising a body portion, wings extending outwardly from the body portion and at substantially right angles thereto, and tips extending from said wings at substantially right angles thereto.

2. In a securing means for anti-skid chains for a vehicle wheel, a lug comprising a body portion, wings extending from the side edges of the body portion and projecting outwardly from the plane of the body, and tips extending from said wings at substantially right angles thereto, said body portion having an opening therethrough between said wings for receiving a bolt therethrough to secure the lug to a wheel.

3. In a securing means for anti-skid chains, a lug comprising a body portion, wings extending outwardly from the body portion and at substantially right angles thereto, and tips extending from said wings at substantially right angles thereto, said wings having their outer surfaces arcuate to conform to the shape of the links of the anti-skid chain.

In testimony whereof, I have affixed my signature.

ALEXIS F. GILLET.